United States Patent [19]

Lyons et al.

[11] Patent Number: 5,004,542
[45] Date of Patent: Apr. 2, 1991

[54] FILTER MEMBRANE WITH FLEXURE

[75] Inventors: Nicholas Lyons, Horsham; William R. S. Baxter; Adrian M. Woodward, both of Cambridge; Roger W. Clarke, Cambridge, all of England

[73] Assignee: Alcan International Limited, Montreal, Canada

[21] Appl. No.: 545,112

[22] Filed: Jun. 22, 1990

Related U.S. Application Data

[63] Continuation of Ser. No. 143,452, Jan. 12, 1988, abandoned.

[30] Foreign Application Priority Data

Jan. 16, 1987 [GB] United Kingdom ................. 8701055

[51] Int. Cl.⁵ .............................................. B01D 65/00
[52] U.S. Cl. ..................................... 210/356; 210/450
[58] Field of Search .............. 210/356, 450, 446, 445, 210/447

[56] References Cited

U.S. PATENT DOCUMENTS 4,113,627  9/1978  Leason .................................. 210/446
4,671,873  6/1987  Keller .............................. 210/445 X Primary Examiner—Frank Spear
Attorney, Agent, or Firm—Cooper & Dunham

[57] ABSTRACT

A filter of the type incorporating a porous filter membrane 1. Frequently such membranes are very fragile, and the invention describes an improved way of mounting them within the housing. Attached to a perimeter portion of the membrane 1 is a thin strip 8 of flexible material such as polypropylene. The strip 8 is attached, on the one hand, to the base 4 of the filter housing by a first joint 10 and, on the other hand, to the perimeter of the membrane by a second joint 9. Between the two joints is a region of flexure which enables the membrane to float relative to the housing, thus isolating the membrane from relative movement between the membrane and the housing.

12 Claims, 1 Drawing Sheet

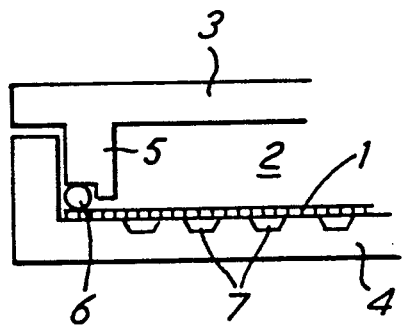
FIG.1
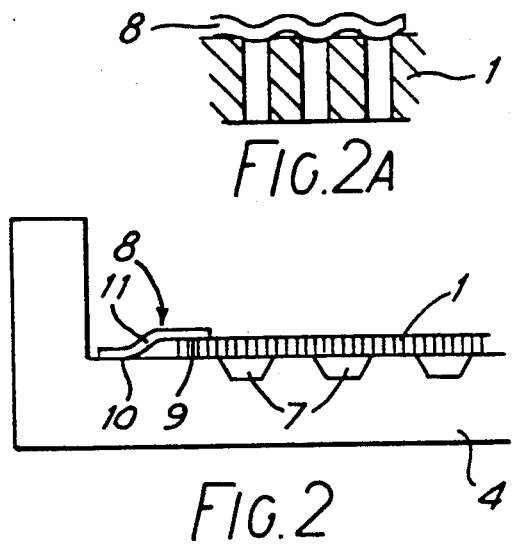
FIG.2A
FIG.2
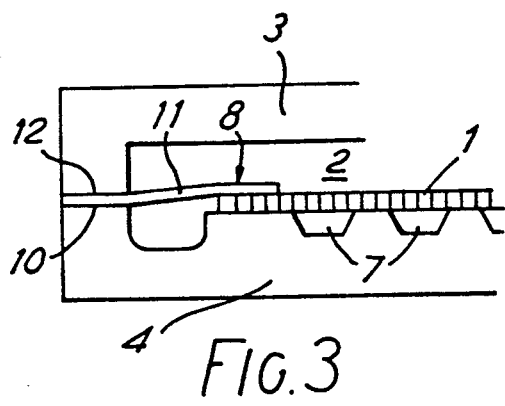
FIG.3
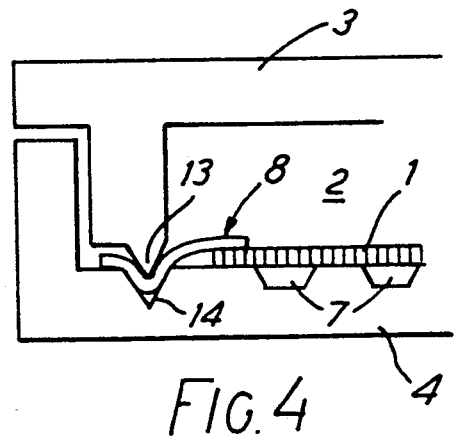
FIG.4
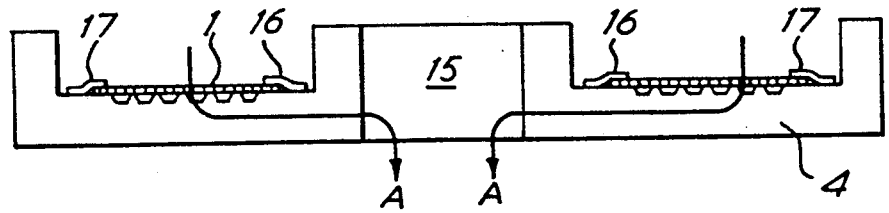
FIG.5
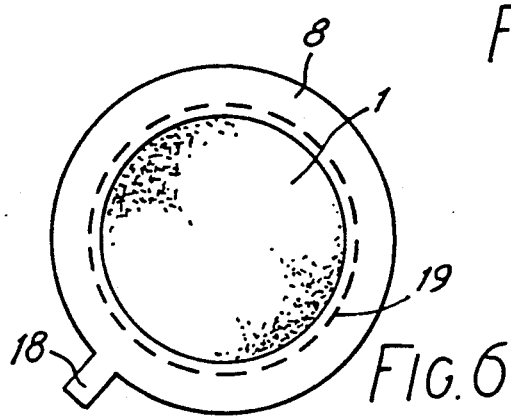
FIG.6
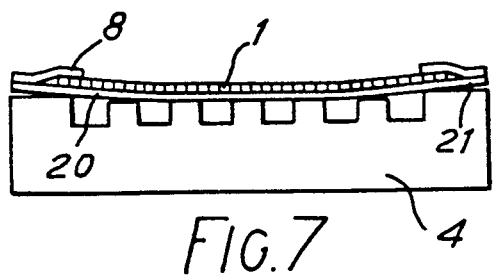
FIG.7

FILTER MEMBRANE WITH FLEXURE

This is a continuation of application Ser. No. 143,452, filed Jan. 12, 1988.

This invention relates to filters of the type incorporating a porous membrane.

The membranes used in such filters may be made from various types of polymeric material, or may be made of inorganic material. A particular type of ceramic filter membrane is described in European patent application 0178831. Many of these types of filter membrane are very fragile and unless properly supported within the filter housing can be damaged in use due to the pressure of the flow through it and/or the effects of differential thermal expansion as between the membrane and the housing. With such fragile membranes, the support used has to be designed so that no large areas of the membrane are left unsupported. A typical arrangement as described in British patent 2063089, in which a membrane support surface comprises a pair of circumferential lands and a series of intervening circumferential ribs which together define a common plane surface. The distance between adjacent ribs is nowhere too great to result in too great a span for the membrane lying on the surface. In the described arrangement, the membrane (which is of the polymeric type) is attached to the surface by being sealed to the surfaces of the lands and the ribs. However this arrangement can lead to localised high stresses in the membrane in the region of the joints and this can in turn lead to premature failure in service. This situation can be exacerbated, particularly in membranes made of brittle material, in circumstances where the filter is operating at high temperatures, and where there is a significant discrepancy between the co-efficient of thermal expansion of the membrane as compared with that of the material of the support. Furthermore, in certain types of membrane filters having "straight-through" fluid passageways, such as described in the aforementioned EP 0178831, the practice of attaching the membrane at all the lands and ribs results in the occlusion of a large proportion of the available active surface, and is difficult to control accurately.

An alternative would be the use of an "O" ring as shown in FIG. 1 of the accompanying drawings. The drawing shows a section through part of a filter incorporating a thin filter membrane 1. Fluid to be filtered enters an input chamber 2 defined between a lid 3 and base 4 of a housing which is usually circular in plan and of rigid material. The lid 3 has a downwardly extending annular ridge 5 which provides a sealing connection with the base 4 via an "O" ring 6. A series of circumferential grooves in the top surface of the base form channels 7 which collect filtered fluid which is passed to an output conduit (not shown). It will be seen that the membrane 1 is physically supported by the upstanding portions between channels 7. Securement of the membrane is achieved by sandwiching it between the "O" ring and the base. This form of connection, whilst securely retaining and sealing the edge of the membrane enables small movements of the membrane to take place to counteract forces applied to it during operation—for example due to differential thermal expansion as between the membrane and the material of the base. However, the use of an "O" ring, whilst effective, is relatively expensive (particularly for disposable devices) and is likely to compromise the inherent chemical resistance of certain types of membrane. Furthermore, "O" rings require tight tolerance control to work effectively which is difficult to engineer in high volume parts which are commonly injection mouldings of plastics material.

These problems can be alleviated by the filter of the present invention which comprises a housing, a filter membrane made of porous material for filtering fluid passing through said filter, and a sheet of flexible impermeable material attached, on the one hand to the perimeter portion of the membrane and, on the other hand to the housing, to thereby mount the membrane relative to the housing in such a way as to allow the membrane to float with respect to the housing. This strip of material is preferably very thin —more in the nature of a film of material in the range 20 to 100 microns, typically 30 microns thick—but thicker materials may be utilised provided that good flexibility is retained—for example closed foam materials are possible. The material for the film strip should be inert to the substance to be filtered, and should also be joinable to the membrane. Suitable materials include polypropylene, polyethylene, ionomer, neoprene or p.t.f.e.

The filter membrane may be made of any suitable porous material, but the technique of the invention is particularly applicable to fragile membranes which could easily be damaged if not correctly supported within the housing. Examples of such membranes are aluminum oxide membranes or other inorganic membranes which are brittle in nature.

The filter membranes commonly used are planar sheet membranes of circular shape; however other shapes such as oval and rectangular are also known. However the membrane does not necessarily have to be planar; there may in some circumstances be advantage in using non-planar membranes, such as tubular or conical membranes, or membranes which are corrugated or ribbed. Tubular or conical membranes may be formed from flat membranes which are bent or helically coiled to the appropriate shape. The techniques of the present invention may be applied also to these non-planar varieties of membrane, but the particular manner in which the film strip is attached will depend upon the particular shape of membrane and upon the requirements of the particular application.

The strip may be attached to the perimeter edge of the membrane in various ways, according to the particular circumstances. Preferably the connection is a continuous sealing connection in order to prevent leakage around the edge of the membrane. Attachment may be by way of an overlapping joint secured by adhesive or solvent bonding, or by hot or cold welding or friction welding, and will to a large extent be dictated by the materials to be attached, and by the intended useage. Preferably the connection is formed as close to the perimeter edge of the membrane as possible in order to leave the maximum possible area for flow.

Preferably the flexibility of the sheet of impermeable material is considerably greater than that of the membrane. This ensures that, when in place, the membrane will "float" with respect to the housing and will thus be to a substantial extent isolated from movement of the material of the housing. Many of the membranes used are very weak in compression in the plane of the membrane, such forces quickly causing buckling and cracking of the membrane material. The flexible sheet used to mount the membrane does not transmit such compressive forces in the plane of the membrane and hence avoids such buckling or cracking. On the other hand, although the flexible sheet can transmit radial tension forces, the membrane is very strong when stressed in this way and tension forces do not cause problems. Thus, in summary, the membrane needs to be mounted in such a way that relative movement between the housing and the membrane does not impose significant compressive stress in the plane of the membrane. The sheet mounting used in the filter of the invention cannot impose significant compressive stress acting in the plane of the membrane. Torsional stress, due to relative rotation as between the membrane and its housing, is also not transmitted in significant amounts, this particularly being the case if the sheet is in a slack or relaxed (i.e. not under any form of tension) state.

The teaching of the present invention is particularly useful in disposable plastics filters of the type commonly made by injection moulding of plastics material. However, other materials such as ceramics, metals or glass could be used if appropriate for particular circumstances. The filter is similar in construction to that illustrated in FIG. 1, comprising a base portion incorporating outlet flow channels on which the membrane is supported, and a lid sealingly connected with the base and defining above the membrane an inlet chamber for liquid to be filtered. The membrane, instead of being secured by the "O" ring, as in the FIG. 1 arrangement, is secured by attachment of the strip to the base portion or alternatively to the lid. This attachment preferably takes the form of a continuous connection in order to prevent leakage around the membrane. The connection is spaced from that between the strip and the membrane to leave a small area of strip between the two connections, to allow for differential movement.

The lid and base portion may be attached together by adhesives, or welding or by mechanical means such as nuts and bolts. If necessary a seal may be effected between the lid and base portion by trapping therebetween the edge of the strip, the arrangement thus acting as an attachment for the strip and hence the membrane.

In order that the invention may be better understood, several embodiments thereof will now be described by way of example only and with reference to the accompanying drawings in which:

FIG. 1 is a diagrammatic partial side view of a filter incorporating an "O" ring seal;

FIGS. 2 to 4 are views similar to FIG. 1 showing embodiments of the filter of the invention;

FIG. 5 is a diagrammatic side sectional view of the base portion of an annular filter constructed in accordance with the invention;

FIG. 6 is a plan view of a filter membrane assembly adapted for use as a replacement element assembly for existing filters; and FIG. 7 is a diagrammatic side sectional view of a filter base portion incorporating a reinforced filter membrane.

Referring firstly to FIG. 2, it will be seen that the filter membrane 1 is attached to the base member 4 by way of a thin strip 8. In a circular filter (the most common shape) the strip 8 is annular in form, and FIG. 2 thus shows a section through one half of the strip 8. The strip 8 is made from flexible sheet material, for example plastics material such as polyethylene or polypropylene, and is typically 30 microns thick. The strip 8 is formed with two continuous spaced annular joints: one (9) between the strip and the membrane and one (10) between the strip and the perimeter of the upper surface of the base portion 4. The manner in which these joints are formed will depend upon the materials being joined—adhesive or solvent bonding, hot or cold welding or friction welding are all possibilities. In the enlarged section of FIG. 2A there is illustrated the result of cold welding using pressure to force the material of the strip 8 in to the passageways in the membrane. The membrane shown here is that described in the aformentioned EP 0178831.

The space 11 between the two joints 9, 10 defines a region of flexure which is operable to isolate the membrane from relative movement as between the membrane and the adjacent parts 3, 4 of the housing. The presence of this region of flexure allows the membrane to "float" relative to the housing, allowing a small degree of movement of the membrane 1 relative to the housing to thereby relieve stresses which occur during operation. The strip 8 can flex and stretch in order to accommodate this movement without causing damage to the fragile membrane. The strip also protects the edge of the membrane, preventing it from cracking, and also inhibiting the propagation of any cracks which do form into the interior of the membrane. The distance between joints 9 and 10—and hence the width of the region 11—is dependent upon the particular construction envisaged, but in the typical circular planar construction illustrated, a general guide to the radial distance between the two joints would be in the region of 3 to 6% of the diameter of the membrane.

The strip is very thin to give maximum flexibility, but must not be too thin otherwise it will not be capable of providing reliable joints. Thicknesses in the range 20 to 100 microns have been tested, with 30 microns giving particularly good results. Strips made of foam material—closed pore foam polyethylene—have also been tried, but these are much thicker—typically 0.5 to 2.00 mm.

The membrane equipped with strip 8 is free to conform to surface undulation (common in injection moulded parts) rather than being locked to the upper surface of base portion 4, and experience shows that this reduces the specification of surface features which is needed to successfully mount the membrane— previously such specifications had been very strict, leading to a high rejection rate and increased costs. Also, temperature variations can now be readily accommodated due to the inherent "float" between the membrane and its housing.

FIG. 3 shows an alternative arrangement in which the joint 10 is formed by trapping the perimeter of the strip 8 between the base portion 4 and lid 3 of the filter housing. This achieves the same object, but enables the exterior dimensions of the filter to be reduced for a given size of active membrane area. The lid 3 is attached by way of a further joint 12 between the upper surface of the strip 8 and the lid 3, this joint can be made by any of the methods mentioned above. Alternatively, a mechanical means such as spaced bolts can be provided for attaching the lid 3 to the base portion 4—in this case the strip 8 acts as a seal between the two parts.

FIG. 4 shows a further alternative arrangement in which the outer edge of strip 8 is trapped between an annular ridge 13 formed on the lid 3 and a co-operating V-groove 14 formed in the upper surface of the base portion 4. The lid 3 is attached directly to the base portion 4 by any suitable means, and sealing is effected by the strip 8.

FIG. 5 shows the use of the invention in an annular filter. The drawing shows one section of what is in fact a stack of filter units. The underside of the base unit 4 for each section acts as the lid for the next section down. A central aperture 15 is connected by means (not shown) to the channels 7 and thus collects the filtered fluid; the general direction of liquid flow is illustrated by arrows A. The filter membrane 1 is annular in shape and is secured with two annular strips 16, 17 each similar to strip 8. In FIG. 5, the manner of connection of the strips 16, 17 is similar to that shown in FIG. 2, but other methods could be used.

FIG. 6 is a plan view of a filter membrane assembly comprising just a membrane and attached strip 8, which assembly is specially adapted for handling by incorporation of a tab 18 integral with the strip 8. In the drawing, the edge of the membrane is shown by dotted line 19. Other than the tab, the assembly shown in FIG. 6 is identical to that which might be used in the embodiments of FIGS. 2 to 4. However, the use of one or more tabs evenly spaced around the circumference makes handling easier and thus assists in enabling the assembly to be used as a replacement filter element in an existing unit. Since it is frequently the case that existing units will already have a seal such as an "O" ring built into the structure of the filter housing, the filter assembly of FIG. 6 will utilise such seal in a manner similar to that shown in FIG. 1, but with the "O" ring bearing against the area of the strip 8 close to its perimeter and thus, when the filter is assembled, forming the outermost joint 10.

In some applications, membrane support configurations can be encountered which a fragile membrane cannot tolerate without damage due to, for example, large span widths or uneven surfaces. In this case, the membrane assembly may further comprise a reinforcing layer, such as shown in FIG. 7. In this case, the membrane 1 is expected to span the considerable distance between opposite upstanding edges of a filter base portion 4. For the sake of clarity the degree of bending of the membrane assembly illustrated in FIG. 7 is greatly exaggerated. A reinforcing layer 20, for example of foil mesh, is placed underneath the membrane to support same. The strip 8 can then be attached, not directly to the base portion, as previously, but to the protruding edge 21 of the layer 20 to thereby produce a unitary assembly which can be used for replacement purposes. The assembly comprising the layer 20, membrane 1 and strip 8 is attached to the housing by any suitable means. It has been found that an electroformed foil mesh will give good support in such circumstances, and the strip 8 may be bonded to this reinforcing layer 20. This very thin assembly (typically 50–150 microns thick) can be retrofitted into existing filters at low cost. In an alternative construction (not shown) the strip 8 is of such a width that it extends beyond the edge 21 so that it may be attached directly to the base portion 4 in the manner described above with reference to FIGS. 2, 3 or 4. In this latter construction the strip 8 may or may not be attached to the layer 20 in addition to its attachment to the base portion.

The material used for the attachment strips 8 (or 16 or 17) in the above-described embodiments is readily available, and cheap, and can be cut or punched from extruded blown product. Cast film can also be used for the strip, and this product may be preferable in view of its non-directional properties.

The shape of the membranes is commonly circular, leading to a strip 8 of annular configuration; however, membranes of oval or rectangular or other shapes are occasionally found. Furthermore, the membranes may be non-planar, for example corrugated or ribbed or tubular or conical and the techniques of the invention may be applied to these non-circular and/or non-planar versions also.

We claim:

1. A filter comprising a housing, a filter membrane made of porous material for filtering fluid passing through said filter, and a sheet of flexible impermeable material attached to the perimeter portion of the membrane and to the housing, to thereby mount the membrane relative to the housing in such a way as to allow the membrane to float with respect to the housing, said sheet of flexible material having
   (a) two lines of securement:
      (i) a first line of securement securing the flexible sheet to the membrane, and
      (ii) a second line of securement securing the flexible sheet to the housing, said second line of securement being spaced, along the surface of the sheet, from the first, and
   (b) a sheet portion, in the space between the two lines of securement, constituting a region of flexure operable to isolate the membrane from relative movement between the membrane material and the housing.

2. A filter according to claim 1 wherein the sheet takes the form of a strip attached around the perimeter of the membrane in such a way that the strip protrudes widthwise beyond the membrane in the same general plane as the membrane.

3. A filter according to claim 2 wherein the strip is continuous around the perimeter of the membrane.

4. A filter according to claim 1 wherein the flexibility of the material of the sheet is considerably greater than that of the membrane.

5. A filter according to claim 1 wherein said first line of securement takes the form of a continuous sealed joint.

6. A filter according to claim 1 wherein said second line of securement takes the form of a continuous sealed joint.

7. A filter according to claim 1 wherein said membrane is substantially planar, and wherein said second line of securement is positioned outwardly, with respect to the membrane, from the first line of securement in the general plane of the membrane.

8. A filter according to claim 1 wherein the membrane is laid against a generally planar inside surface of said housing, the housing on that side of said surface remote from the membrane being hollow to define an inlet chamber for fluid to be filtered, and wherein said surface is formed with interconnecting grooves leading to an outlet orifice, said interconnecting grooves together defining an outlet chamber for filtered fluid.

9. A filter according to claim 1 further comprising a layer of reinforcing material placed against the membrane to support same.

10. A filter according to claim 9 wherein the reinforcing material is foil mesh.

11. A filter membrane according to claim 9 wherein the sheet of flexible impermeable material is attached to the reinforcing layer which is itself attached to the housing.

12. A filter according to claim 1 wherein the filter membrane is made from brittle material.

* * * * *